United States Patent
Balasubramanian et al.

(10) Patent No.: US 8,335,673 B2
(45) Date of Patent: Dec. 18, 2012

(54) MODELING COMPLEX HIEARCHICAL SYSTEMS ACROSS SPACE AND TIME

(75) Inventors: Swaminathan Balasubramanian, Troy, MI (US); Jay K. Strosnider, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 12/629,156

(22) Filed: Dec. 2, 2009

(65) Prior Publication Data

US 2011/0131024 A1    Jun. 2, 2011

(51) Int. Cl.
*G06F 17/50* (2006.01)
*G06F 15/16* (2006.01)
*G06F 15/167* (2006.01)
*G06F 15/177* (2006.01)
*G06F 17/00* (2006.01)
*G06F 3/00* (2006.01)
*G01B 3/44* (2006.01)
*G06Q 10/00* (2006.01)
*G06Q 30/00* (2006.01)

(52) U.S. Cl. ............... 703/6; 703/2; 345/420; 345/427; 345/473; 345/582; 345/633; 702/34; 702/45; 705/1.1; 705/14.4; 705/26.8; 705/27.2; 709/206; 709/219; 709/223; 709/227; 715/243; 715/741; 715/752; 715/757; 715/848

(58) Field of Classification Search ............... 703/2, 6; 345/420, 427, 473, 582, 633; 702/34, 45, 702/185; 705/1.1, 14.4, 26.8, 27.2; 709/206, 709/219, 223, 227; 715/243, 741, 752, 757, 715/848

See application file for complete search history.

(56) References Cited

U.S. PATENT DOCUMENTS

| | | | | |
|---|---|---|---|---|
| 5,588,139 A * | 12/1996 | Lanier et al. | ...................... | 703/1 |
| 5,835,094 A * | 11/1998 | Ermel et al. | .................. | 715/848 |
| 5,889,951 A * | 3/1999 | Lombardi | ..................... | 709/219 |
| 5,926,179 A * | 7/1999 | Matsuda et al. | .............. | 715/752 |
| 5,930,154 A * | 7/1999 | Thalhammer-Reyero | ...... | 703/11 |
| 5,956,038 A * | 9/1999 | Rekimoto | ..................... | 345/419 |
| 6,023,270 A * | 2/2000 | Brush et al. | ................... | 715/741 |
| 6,054,991 A * | 4/2000 | Crane et al. | ................... | 345/420 |
| 6,057,856 A * | 5/2000 | Miyashita et al. | ............ | 345/633 |
| 6,058,397 A * | 5/2000 | Barrus et al. | .......................... | 1/1 |

(Continued)

OTHER PUBLICATIONS

Ali, Walid. "Developing 2D and 3D MultiAgent Geosimulation, a Method and its Application: The Case of Shopping Behavior Geosimulation in Square One Mall (Toronto)", 2006.*

(Continued)

*Primary Examiner* — Shambhavi Patel
(74) *Attorney, Agent, or Firm* — Yudell Isidore Ng Russell PLLC (57) ABSTRACT

A system model of a real-world system includes a multi-level hierarchy of Capabilities, where each Capability includes a Verb specifying an action and an Object acted on by the Verb. The system model also contains one or more multi-level Performer hierarchies, where each Performer hierarchy includes a plurality of Performers each having an associated lifecycle and at least one associated Capability provided or required by the Performer. In addition, a multi-level Location hierarchy associates one of a plurality of Locations with each Performer. A plurality of Capability Instances define requirement and provision of Capabilities by Performers in the one or more multi-level Performer hierarchies. In response to a query specifying a Location and a time, a view of the system model for the specified Location and time is output.

28 Claims, 6 Drawing Sheets

U.S. PATENT DOCUMENTS

| | | | | |
|---|---|---|---|---|
| 6,064,998 | A * | 5/2000 | Zabloudil et al. | 706/45 |
| 6,078,329 | A * | 6/2000 | Umeki et al. | 345/419 |
| 6,167,433 | A * | 12/2000 | Maples et al. | 709/204 |
| 6,271,854 | B1 * | 8/2001 | Light | 345/427 |
| 6,377,263 | B1 * | 4/2002 | Falacara et al. | 345/473 |
| 6,437,777 | B1 * | 8/2002 | Kamachi et al. | 345/419 |
| 6,466,239 | B2 * | 10/2002 | Ishikawa | 715/850 |
| 6,476,830 | B1 * | 11/2002 | Farmer et al. | 715/769 |
| 6,507,353 | B1 * | 1/2003 | Huard et al. | 715/863 |
| 6,518,989 | B1 * | 2/2003 | Ishikawa | 715/848 |
| 6,577,328 | B2 * | 6/2003 | Matsuda et al. | 715/757 |
| 6,798,407 | B1 * | 9/2004 | Benman | 345/419 |
| 6,983,227 | B1 * | 1/2006 | Thalhammer-Reyero | 703/2 |
| 7,018,443 | B2 * | 3/2006 | Kutt et al. | 95/8 |
| 7,038,694 | B1 * | 5/2006 | Santodomingo et al. | 345/582 |
| 7,070,277 | B2 * | 7/2006 | Trumbull | 352/243 |
| 7,143,100 | B2 * | 11/2006 | Carlson et al. | 1/1 |
| 7,191,110 | B1 * | 3/2007 | Charbel et al. | 703/11 |
| 7,209,927 | B2 * | 4/2007 | Donatelli et al. | 707/694 |
| 7,318,015 | B2 * | 1/2008 | Carlson et al. | 703/21 |
| 7,396,281 | B2 * | 7/2008 | Mendelsohn et al. | 463/42 |
| 7,570,261 | B1 * | 8/2009 | Edecker et al. | 345/420 |
| 7,623,973 | B1 * | 11/2009 | Wang et al. | 702/34 |
| 7,657,406 | B2 * | 2/2010 | Tolone et al. | 703/2 |
| 7,805,284 | B2 * | 9/2010 | Konno et al. | 703/2 |
| 7,814,211 | B2 * | 10/2010 | Vernal et al. | 709/227 |
| 7,861,158 | B2 * | 12/2010 | Martin et al. | 715/243 |
| 7,869,964 | B2 * | 1/2011 | Rosati et al. | 702/45 |
| 7,908,462 | B2 * | 3/2011 | Sung | 712/28 |
| 7,917,371 | B2 * | 3/2011 | Jung et al. | 705/1.1 |
| 7,925,703 | B2 * | 4/2011 | Dinan et al. | 709/206 |
| 7,941,301 | B2 * | 5/2011 | Pulfer | 703/2 |
| 8,040,361 | B2 * | 10/2011 | Bachelder et al. | 345/633 |
| 2001/0034661 | A1 * | 10/2001 | Ferreira | 705/26 |
| 2003/0018490 | A1 * | 1/2003 | Magers et al. | 705/1 |
| 2003/0117397 | A1 * | 6/2003 | Hubrecht et al. | 345/420 |
| 2009/0094007 | A1 * | 4/2009 | Konno et al. | 703/6 |
| 2009/0306946 | A1 * | 12/2009 | Badler et al. | 703/2 |
| 2010/0020075 | A1 * | 1/2010 | Edecker et al. | 345/420 |
| 2010/0042458 | A1 * | 2/2010 | Rashid et al. | 705/8 |
| 2011/0113383 | A1 * | 5/2011 | Dyack et al. | 715/850 |

OTHER PUBLICATIONS

Campos et al. "An Agent Based Framework for Visual-Interactive Ecosystem Simulations", SCS Transactions on Simulation, 15(4):139-152, Dec. 1998.*

Cederman et al. "Growing Sovereignty: Organizational Shifts in State Systems ", Mar. 2005.*

Chatfield et al. "A multi-formalism architecture for agent-based, order-centric supply chain simulation", Simulation Modelling Practice and Theory 15 (2007) 153-174.*

Comptdaer et al. "Multi-scale behavioral models for urban crisis training simulation", 2007.*

Perret et al. "A Multi-Agent System for the simulation of urban dynamics", Aug. 2010.*

Iglesias et al. "Intelligent Agents in Virtual Worlds", IEEE Proceedings of the 2004 International Conference on Cyberworlds (CW'04).*

Iglesias et al. "Behavioral Animation of Virtual Agents", 2003.*

Kallmann et al. "Constructing Virtual Human Life Simulations", In Proceedings of the Workshop on Deformable Avatars, Lausanne, Switzerland, 2000, 240-247.*

Parket et al. "Multi-Agent Systems for the Simulation of Land-Use and Land-Cover Change: A Review", 2002.*

Batty et al. "Possible Urban Automata", Environment and Planning B: Planning and Design 1997, vol. 24, pp. 175-192.*

Pumain et al. "The Socio-Spatial Dynamics of Systems of Cities and Innovation Processes: a Multi-Level Model", 2007.*

Thalmann et al. "Simulating a Human Society: The Challenges", Feb. 2003.*

Ulicny et al. "Towards Interactive Real-Time Crowd Behavior Simulation", vol. 21 (2002), No. 4 pp. 767-775.*

Zhuge et al. "A federation-agent-workflow simulation framework for virtual organisation development", Information & Management 39 (2002) 325-336.*

Debnath, N. et al; Improving Model Driven Architecture with Requirements Models; Information Technology: New Generations, 2008; ITNG 2008; Fifth International Conference on Apr. 7-9, 2008; pp. 21-26.

Bouziane, Hinde Lilia et al; A Software Component Model with Spatial and Temporal Compositions for Grid Infrastructures; Topic 9: Parallel and Distributed Programming, pp. 698-708, Year of Publication: 2008; ISBN: 978-3-540-85450-0.

Goedertier, Stijn et al; EM-BrA2CE v0.1: A Vocabulary and Execution Model for Declarative Business Process Modeling; Department of Decision Sciences and Information Management; Katholieke Universiteit Leuven.

Devereux, Drew; Capability-based Description and Discovery of Services; PhD Thesis, School of Information Technology and Electrical Engineering, University of Queensland, St Lucia 4072, Australia, Oct. 24, 2003.

* cited by examiner

MODELING COMPLEX HIERARCHICAL SYSTEMS ACROSS SPACE AND TIME

BACKGROUND OF THE INVENTION

1. Technical Field

The present invention relates in general to modeling real world systems and processes and, in particular, to modeling complex hierarchical systems.

2. Description of the Related Art

A complex system is typically composed of many subsystems with a large number of interdependencies. A subsystem may itself be complex, in which case such a subsystem is composed of other subsystems. A characteristic of a complex system is the presence of multiple hierarchies or natural orders of its constituent parts. Another characteristic of a complex system is the presence of variations in structure and function, both temporally and spatially.

In the prior art, modeling languages such as Unified Modeling Language (UML) and Systems Modeling Language (SysML) have been utilized to model systems, including complex hierarchical systems. These languages have further been embodied in commercially available modeling tools, including Rational System Modeler, TeleLogic System Architect and Qualiware, which support the representation of complex hierarchical systems. However, existing modeling languages and modeling tools do not readily support modeling and visualizing systems temporally or spatially.

SUMMARY OF THE INVENTION

In some embodiments, a data processing system constructs, in a system model of a real-world system, a multi-level hierarchy of Capabilities, where each Capability includes a Verb specifying an action and an Object acted on by the Verb. The data processing system also constructs one or more multi-level Performer hierarchies, where each Performer hierarchy includes a plurality of Performers each having an associated lifecycle and at least one associated Capability provided or required by the Performer. The data processing system also constructs a multi-level Location hierarchy associating one of a plurality of Locations with each Performer. The data processing system further constructs a plurality of Capability Instances defining requirement and provision of Capabilities by Performers in the one or more multi-level Performer hierarchies. In response to a query specifying a Location and a time, the data processing system outputs a view of the system model for the specified Location and time.

BRIEF DESCRIPTION OF THE DRAWINGS

The described embodiments, as well as a preferred mode of use, will best be understood by reference to the following detailed description when read in conjunction with the accompanying drawings, wherein.

DETAILED DESCRIPTION OF ILLUSTRATIVE EMBODIMENT

Figure 1:
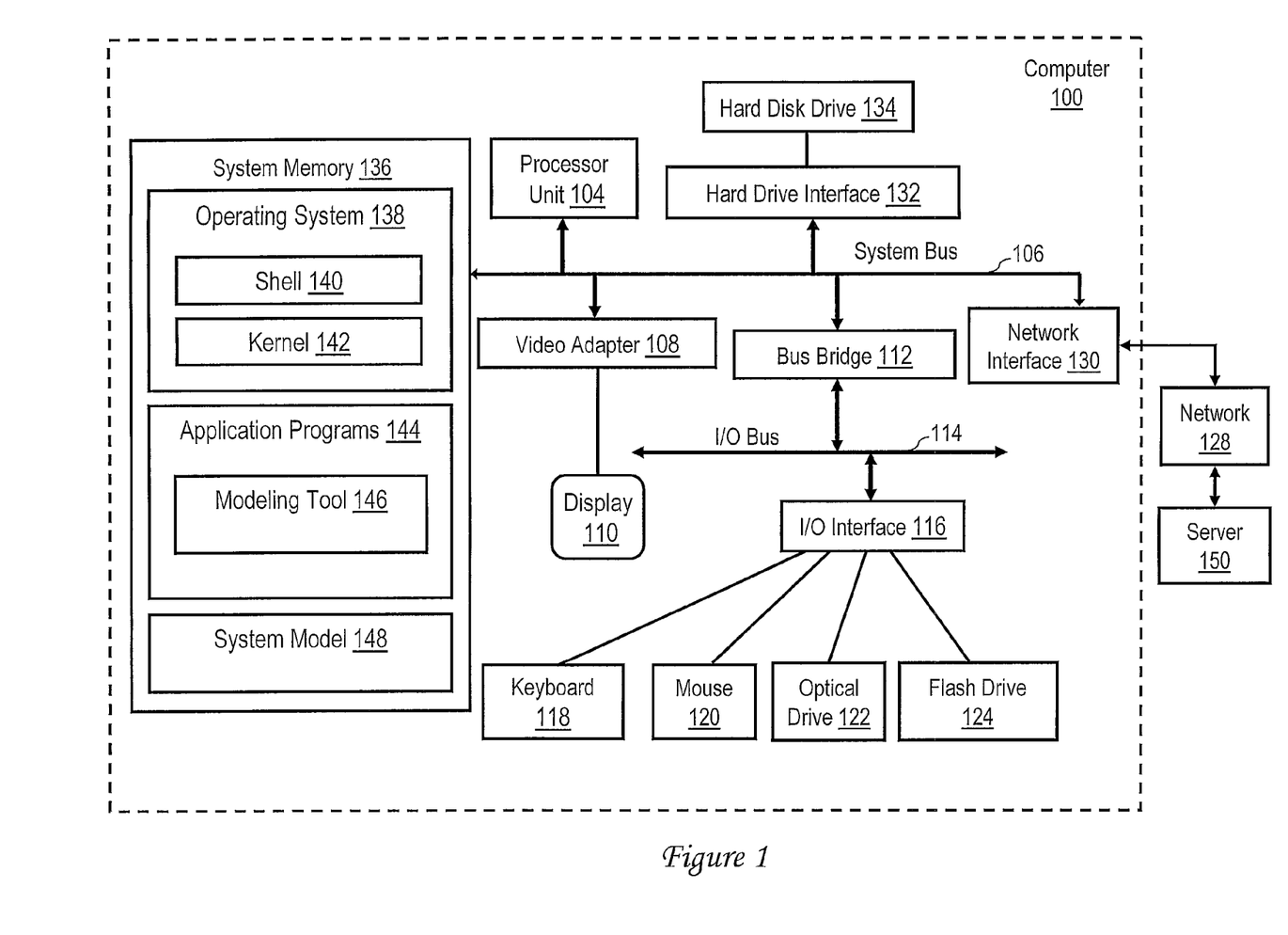
FIG. 1 is a high level block diagram of an exemplary data processing system in accordance with one embodiment.

With reference now to the figures and in particular with reference to FIG. 1, there is depicted a block diagram of an exemplary computer 100 in accordance with one embodiment. In the depicted embodiment, computer 100 includes a processor unit 104 for processing instructions and data. Processor unit 104 is coupled to a system bus 106, which is further coupled to a video adapter 108 that supports a display 110 for visually presenting textual and graphical information. System bus 106 is also coupled via a bus bridge 112 to an Input/Output (I/O) bus 114. I/O bus 114 is coupled to I/O interface 116, which supports communication with various I/O devices, including a keyboard 118, a mouse 120, an optical (CD-ROM or DVD) drive 122, and a flash drive 124. The ports connected to I/O interface 116 may be any known to those skilled in the art of computer architecture, including but not limited to Universal Serial Bus (USB) ports.

Computer 100 communicates with a server 150 via a network 128 using a network interface 130, which is coupled to system bus 106. Network 128 may be a public network such as the Internet, or a private network such as an intranet or a Virtual Private Network (VPN).

A hard drive interface 132, which supports a hard disk drive 134, is also coupled to system bus 106. In a preferred embodiment, non-volatile storage, such as hard disk drive 134, optical drive 122 or flash drive 124, or network communication via network 128 populates a volatile system memory 136 coupled to system bus 106. The volatile memory of computer 100 may of course further include additional higher levels of volatile memory (not shown), including, but not limited to, cache memory, registers, and buffers. Program code that populates system memory 136 can include application programs 144 and an operating system (OS) 138, such as Windows®, UNIX®, AIX or Linux, that manages the resources of computer 100. In at least some embodiments, OS 138 includes a shell 140 (as it is called in UNIX®) for providing a command interpreter and a user interface to the resources of computer 100 (including its application programs 144). OS 138 also includes kernel 142, which provides services to application programs as well as lower level management functions, such as memory management, process and task management, disk management, and mouse and keyboard management.

The hardware elements of computer 100 depicted in FIG. 1 are not intended to be exhaustive, but rather represent and/or highlight certain components that may be utilized to practice the disclosed embodiments. Accordingly, those skilled in the art will appreciate that additional or alternative components may be employed in computer 100 within the spirit and scope of the appended claims.

In addition to optional conventional application programs (e.g., a browser, email client, or office productivity software), application programs 144 in system memory 136 include a modeling tool 146. As described further below, modeling tool 146 can be executed by processor unit 104 to construct, update and query a digital system model 148 representing (and optionally, in some cases controlling) any complex hierarchical real-world system, including without limitation a machine, process, business or other human organization (including governmental or military entity), living organism, weather system, traffic system, communication network, or combination of any of the foregoing. System model 148 will typically comprise a plurality of linked data structures or objects each representing a component of the modeled system.

Modeling tool 146 can embody conventional modeling techniques and primitives and integrates four additional abstractions, namely:

1. a generalized, versioned system hierarchy;
2. a semi-formal, hierarchical Capability Grammar;
3. a generalized, Location Hierarchy; and
4. time.

The foundation of the Capability Grammar of modeling tool 146 is the notion of "Capability," which is defined herein as the ability or potential to perform an action or Verb. Descriptively, a Capability describes what can or needs to be done in the modeled system represented by system model 148. A Capability is seldom stand-alone and usually, but not necessarily, has some form of dependency upon one or more other Capabilities. An enabled Capability is one whose dependencies have been satisfied, whereas a specified Capability is one whose dependencies are not satisfied. In this regard, Capabilities inherit the state of their delivering Performers that perform the Capability. A Capability can be one of the following:

1. Classified Capability—a Capability composed with Classified Verb, Classified Object duples as specified by a domain Capability Grammar;
2. Atomic Capability—a Capability delivered by an Atomic Performer (described further below); or
3. Composite Capability—a Capability composed from more than one Atomic Capability and/or other Composite Capability.

The Capability Grammar of modeling tool 146 preferably further employs the notion of a "Performer," which is defined as an active resource (e.g., human or machine) that provides and/or requires a Capability. Descriptively, a Performer may be a machine, a human worker acting in a classified role, an organizational construct, an application, a sub-system, etc. Performer interactions are orchestrated via a Process that matches Capability pairs including a provided Capability of one Performer and a required Capability of another Performer. Performers consume passive resources (e.g., materials, facilities, capital, etc.). Performers and the passive resources they consume drive the cost of delivering Capabilities.

Figure 2:
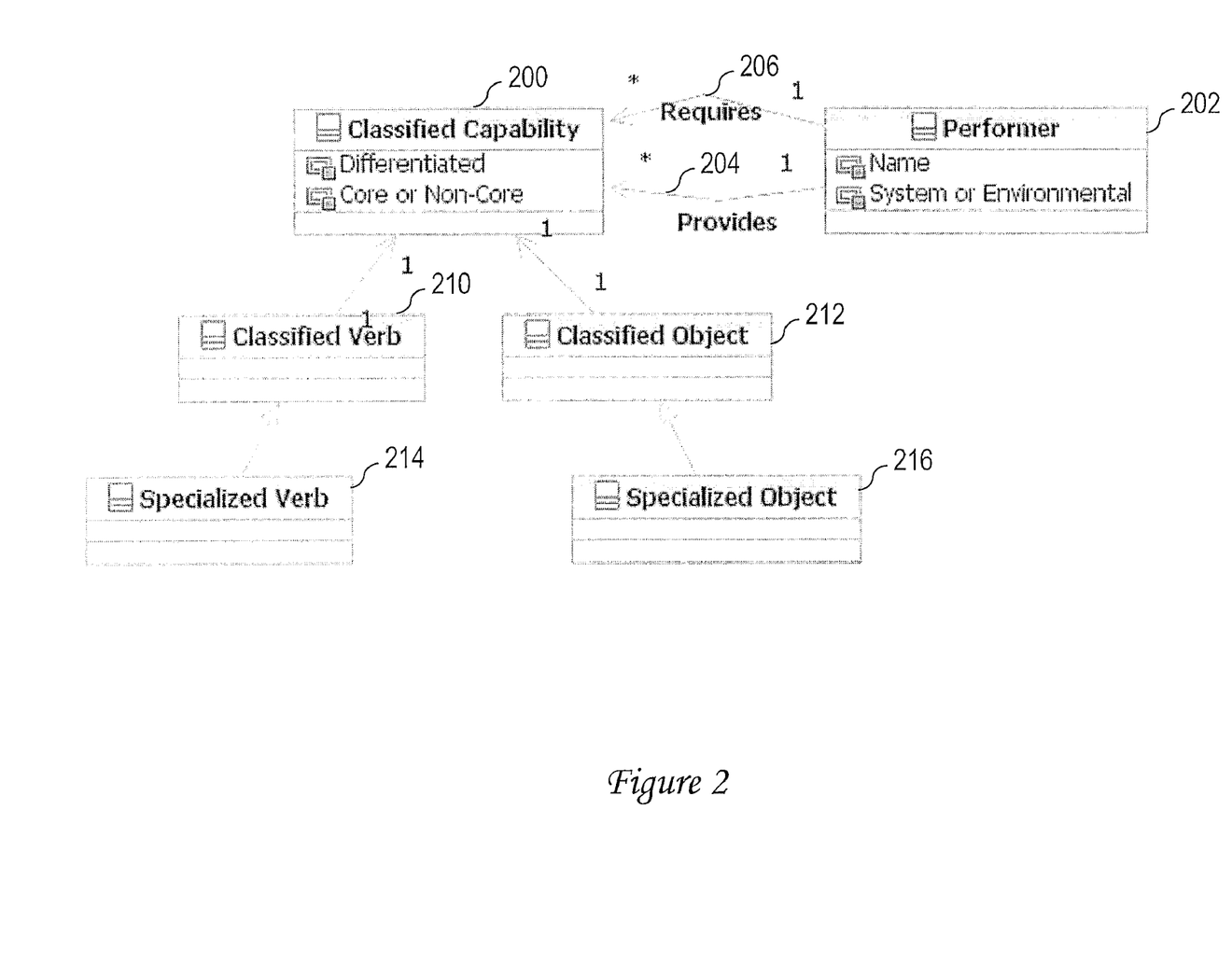
FIG. 2 is a logical model of a classified capability employed by a modeling tool for modeling complex systems in one embodiment.

FIG. 2 is a logical model of a classified Capability employed by modeling tool 146 for modeling complex hierarchical systems in one embodiment. System model 148 of FIG. 1 typically includes many such Capabilities. In the depicted logical model, classified Capability 200 is provided by a delivering Performer (represented by Performer Object 202) via a "provides" association 204. Similarly, a classified Capability 200 may be required by a subject Performer (again represented by Performer Object 202) via the "requires" association 206.

Classified Capability 200 is composed of a pair comprising a Classified Verb 210 stating a provided or required action within the modeled system and a Classified Object 212 acted upon by Classified Verb 210. Classified Object 212 and Classified Verb 210 may optionally be further specialized via a Specialized Verb 214 and a Specialized Object 216, respectively.

Figure 3:
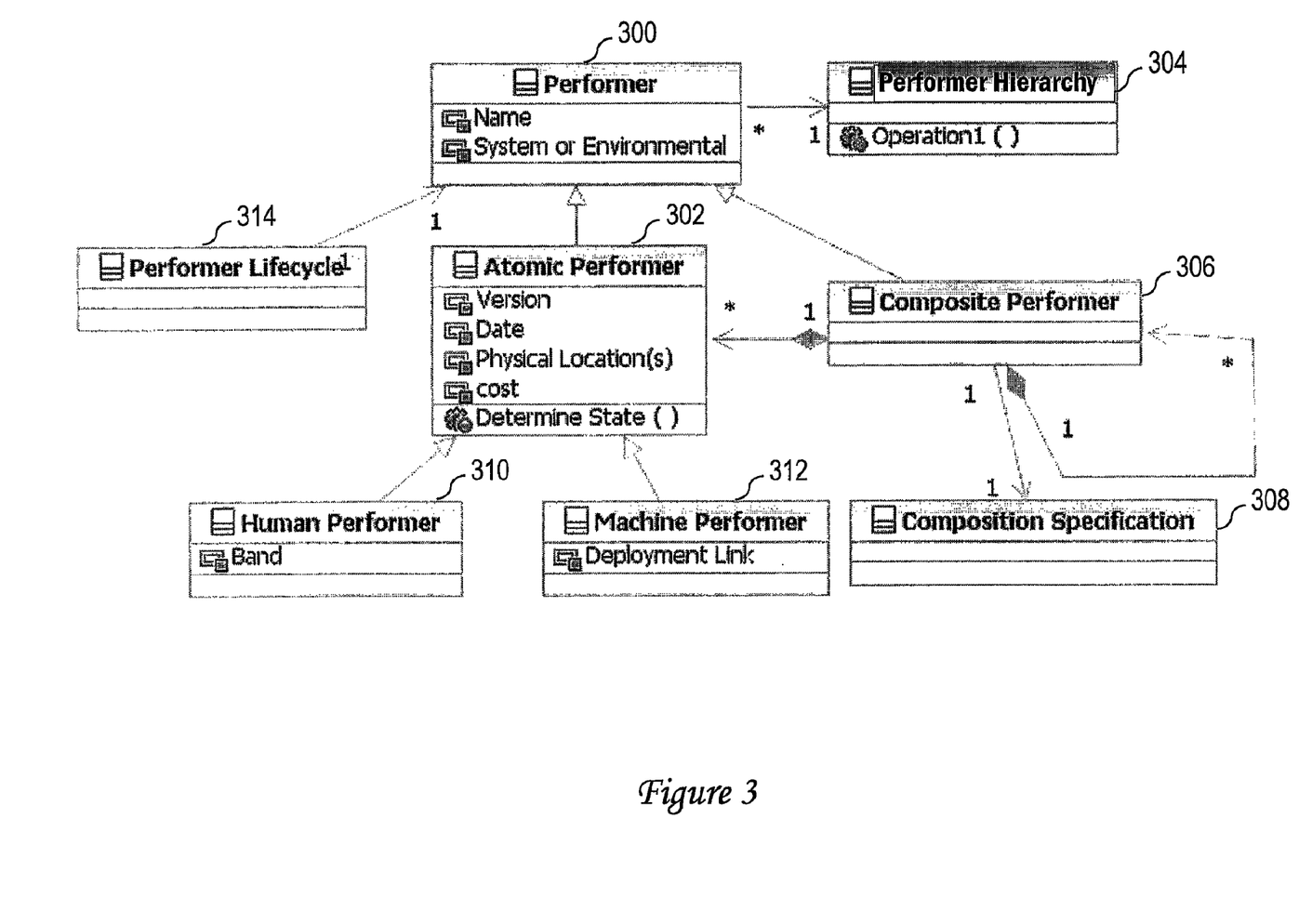
FIG. 3 is a logical model of a performer employed by a modeling tool for modeling complex systems in one embodiment.

FIG. 3 is a logical model of a Performer employed by modeling tool 146 for modeling complex hierarchical systems in one embodiment. As shown in FIG. 3, Performer 300 can be modeled as an Atomic Performer 302, or alternatively, as a Composite Performer 306. An Atomic Performer 302 is the lowest level, non-divisible Performer in a Performer Hierarchy 304. Atomic Performers 302, which are preferably versioned if non-human, are components that can be assembled to form the higher level Performers. An Atomic Performer 302 can further be modeled as a Human Performer 310, or alternatively, as a Machine Performer 312. Further, as indicated, a Performer 300 can be designated as a System Performer within the system boundary of the modeled system, or alternatively, as an Environmental Performer outside the system boundary but within the environment of the modeled system.

FIG. 3 further illustrates that a Composite Performer 306 is composed from Atomic Performers 302 and/or other Composite Performers 306. Composite Performers 306 have an associated Composition Specification 308 specifying the composition of the Composite Performer 306.

Determining to what depth to model any particular complex, hierarchical system is an architectural decision. In an embodiment, the atomic level (at which Atomic Performers 302 are found) is declared at the highest level that suits the intent of the modeling exercise leading to the construction of system model 148. If further decomposition of an Atomic Performer 302 is subsequently desired, modeling tool 146 preferably supports conversion of an Atomic Performer 302 into a Composite Performer 306 and then further decomposition of the new Composite Performer 306 into its constituent Atomic and/or Composite Performers 302, 306.

FIG. 3 further indicates that each Performer 300 preferably is associated in system model 148 with a Performer Lifecycle 314 that specifies the lifecycle of the Performer 300. In an exemplary embodiment, the lifecycle states include, in chronological order:

1. Proposed
2. Planned
3. Under Construction
4. Deployed
5. Retired

Each of these lifecycle states has a start date and end date. Lifecycle state and dates enable modeling tool 146 to support viewing and querying system model 148 across time—past, present and future.

Performer Hierarchy 304 is a hierarchical dependency network of Performers 300. Performer Hierarchy 304 models the static structure of the modeled system, as well as the environment in which the modeled system operates. It should be noted that in at least some embodiments, a modeled system can include one or more Performer Hierarchies 304. A well formed Performer Hierarchy 304 is a fully connected graph of the complete set of constituent Performers 300 regardless of their states and those derived therefrom. The graph defines traceability up and down Performer Hierarchy 304. In addition, Performer Hierarchy 304 supports modular roll-up of the functions and attributes of lower level Performers 300 up to higher level Performers and their attributes.

The root of Performer Hierarchy 304 is the Environment Performer. The simplest Performer Hierarchy would thus be a two-level tree with the root being the Environment Performer and the leaves being Atomic Performers. For example, when modeling a business system with this simple structure of Performer Hierarchy, the root Performer is the business environment performer, and the leaves represent the roles and applications corresponding to human and machine Performers. Of course, in more complex business systems having more than two levels in the Performer Hierarchy, business system roles and applications can be assembled into higher level organizational constructs and sub-systems. The business system Performers interact with each other, as well as business environmental Performers that are outside the business system boundary.

Modeling tool 146 preferably supports viewing (e.g., via display 110) and querying of a Performer Hierarchy 304 by date and/or Performer state. Viewing by date and Performer state prunes from the Performer Hierarchy 304 those Atomic Performers 302, if any, not in the specified state(s) at the specified observation date and parent Performers with no children. Regardless of the pruning of a Performer Hierarchy 304 for purposes of constructing a particular view or query response, a well formed Performer Hierarchy 304 remains a fully connected graph of Performers 300.

Modeling tool 146 further supports the definition within system model 148 of one or more Processes, where a Process is defined as sequence of how Performers 300 consume and/or provide Capabilities. In general, Processes are triggered by defined events. In at least some embodiments, a Process can be defined through a process map, which is a directed graph of Capabilities at any given level of abstraction.

Modeling tool 146 preferably further supports the definition within system model 148 of Locations describing where Performers deliver Capabilities. In some embodiments, locations are physical geographic locations, such as world, region, country, etc. In other embodiments, locations can correspond to regions or partitions of the modeled system. As will be appreciated, locations can be interrelated in a location hierarchy, organized, for example, in a tree structure.

Thus, modeling tool 146 preferably employs all of the following constructs:
1. Capabilities—describing what can or is required to be done;
2. Performers—describing who provides or requires Capabilities;
3. Processes—describing how the Performers interact;
4. Locations—describing where Performers deliver Capabilities;
5. Time—describing when in the simulated chronology of the modeled system the modeled system is viewed and queried.

From these constructs, modeling tool 146 enforces a Capability Grammar governing use and integration of the foregoing constructs. In a preferred embodiment, the Capability Grammar is a specialized, declarative English Subject Verb Object (SVO) grammar of the form:
Subject Performer/Classified Verb/Classified Object/Using Performer prepositional phrase/Location prepositional phrase In this embodiment, the Capability Grammar supports zero or more comma-separated Subject Performers, which are the authorized user(s) or consumer(s) of the Capability. Viewing performers as service components, a Performer's "services required" attribute specifies what Capabilities the performer is authorized to use and/or consume.

In the Capability Grammar, the Capability is specified by a Classified Verb selected among a restricted set of domain-specific verbs and a Classified Object selected among a restricted set of domain-specific objects. The Classified Object is acted upon by the Classified Verb.

In a preferred embodiment, the Using Performer prepositional phase is a restricted prepositional phase including the fixed term "using" followed by zero or more comma-separated Performers. Viewing the Performer as a service component, the specified Capability is one of the using performer's "services provided."

Finally, the Location prepositional phrase is an optional restricted prepositional phrase of the form including the fixed term "in" followed by a Location.

Modeling tool 146 permits the construction of Capability Sentences utilizing the Capability Grammar described above, where a Capability Sentence is defined herein as a valid sentence governed by the Capability Grammar. In a preferred embodiment, a Capability Sentence may be in one of three states:
1. Classified Capability—a Capability Sentence containing only a Classified Verb and Classified Object;
2. Enabled Capability—a Capability provided by a Performer; or
3. Adopted Capability—a full capability sentence specifying a Location of user(s).

The number of Enabled and Adopted Capability sentences within the same capability classification is the number of unique capability instances or more generally, the Capability's variations.

Figure 4:
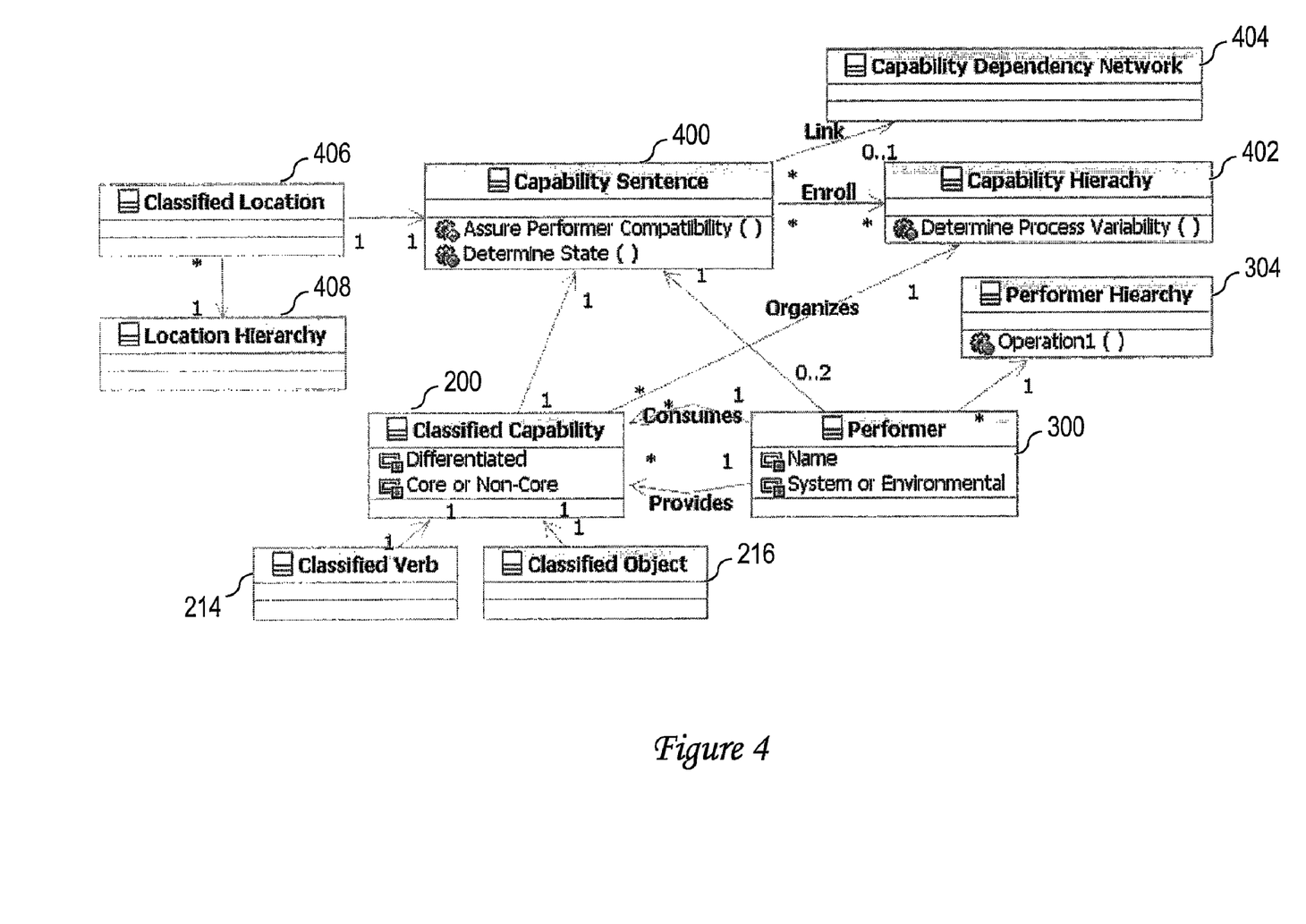
FIG. 4 is a logical model of a capability sentence and associated hierarchies employed by a modeling tool for modeling complex systems in one embodiment.

FIG. 4 illustrates a logical model of a Capability Sentence and associated hierarchies employed by modeling tool 146 for modeling complex hierarchical systems in one embodiment. The model depicted in FIG. 4 incorporates a Classified Capability 200, its Classified Verb 214 and Classified Object 216 (which may be further specialized as discussed above), and a Performer Object 300 and its associated Performer Hierarchy 304, as described above with reference to FIGS. 2-3.

With reference to the model in FIG. 4, a Capability Classification Hierarchy is defined as a hierarchy of capability of Classified Capabilities in their most natural process order. A Capability Classification Hierarchy is a process decomposition hierarchy limited to Classified Verb/Object pairs. When expressed in outline form, child Capabilities are preferably organized in their natural process order to aid human understanding.

Capability Sentences enrolled into the capability classification hierarchy by recording their core Classified Verb/Classified Objects in a Capability Hierarchy 402. As each Capability Sentence 400 is an instance of the Classified Capability 200, the number of sentences enrolled into any level of the Capability Classification Hierarchy is the number of capability variations. This important property of modeling tool 146 enables quantitative process variation analysis for complex systems.

FIG. 4 further illustrates the association by the Capability Sentence 400 of a Classified Location 406 and its Location Hierarchy 408 with a user. In addition, the model given in FIG. 4 shows the linkage of Capability Sentence 400 with a Capability Dependency Network 404 by which enabled and specified Capabilities can be determined.

In order to further illustrate the application of described Capability Grammar by modeling tool 146, an exemplary business services model of a sales division of a business organization will now be described.

In the example, Classified Capabilities 200 are first defined by forming Classified Verbs 214 and Classified Objects 216 in their natural hierarchies. For example, Table I below illustrates an exemplary embodiment of the Classified Verbs defining all of the actions that can be performed in the sales division, namely, Enter, Select, Submit, Register and Manage. As indicated by indention, the Classified Verb named Submit hierarchically includes the more specialized Classified Verbs named Web Submit, Electronic Submit, Telephone Submit and Fax Submit, each representing a modality of submission of an order by the modeled sales division.

TABLE I

Classified Verbs

Enter
Select
Submit
    Web Submit
    Electronic Submit
    Telephone Submit
    Fax Submit
Register
Manage As further summarized in Table II, below, the Classified Objects 216 define all components that can be acted upon by the Classified Verbs 214, namely, Quote, Order, Invoice, Order Status and Forecast. As also indicated by indention, the Classified Object named Quote hierarchically includes the more specialized Classified Objects named Brand 1 Quote and Brand 2 Quote, and the Classified Object named Order hierarchically includes the more specialized Classified Objects named Brand 1 Order, Brand 2 Order and Brand 1 & Brand 2 Order.

TABLE II

Classified Objects

Quote
    Brand 1 Quote
    Brand 2 Quote
Order
    Brand 1 Order
    Brand 2 Order
    Brand 1 & 2 Order
Invoice
Order Status
Forecast Once Classified Verbs 214 and Classified Objects 216 are defined, modeling tool 146 can be utilized to form Classified Capabilities 200 by combining designated pairs of Classified Verbs 214 and Classified Objects 216. Table III, below, summarizes the contents of an exemplary Classified Capability 200 for the exemplary sales division. Thus, in the exemplary implementation, the single Classified Object that is associated with a Classified Verb named Enter is Quote, meaning, for example, that the Classified Verb named Enter cannot legally be applied to other Classified Objects, such as Order or Order Status. Similarly, the pairing of the various child verbs of Submit (i.e., Web Submit, Telephone Submit and Fax Submit) precisely specify what types of Orders can be submitted in the sales division via the worldwide web, via a telephone order, and via a fax order, respectively.

TABLE III

Classified Capability

| Classified Verb | Classified Object |
|---|---|
| Enter | Quote |
|   Enter |   Brand 1 Quote |
|   Enter |   Brand 2 Quote |
| Submit | Order |
|   Web Submit |   Brand 1 Order |
|   Web Submit |   Brand 1 & 2 Order |
|   Telephone Submit |   Brand 1 Order |
|   Fax Submit |   Brand 2 Order |
| Select | Quote |
| Manage | Order Status |
| Manage | Forecast |

With Classified Capability 200 fully defined, modeling tool 146 can also be utilized to define Performers 300 and Performer Hierarchy 304. For example, Table IV, below, summarizes an exemplary Performer Hierarchy 304 including as its root the business Environment, which has the children Performers named MyCompany, Customers, YourCompany, and Shipper. MyCompany further includes the Performers named General Manager, Order Management Department, and Sales Department. The Performer named Order Management Department further includes the child Performers named Customer Service Representative, Customer Service Supervisor, ERP Engine and ERP GUI; and the Performer named Sales Department further includes the child Performers named Technical Sales Representative, Technical Sales Supervisor, TeleSales Client and Web Client. It should be observed that the modeled Performers include an environment, abstractions such as companies, human-based Performers such as a Customer Service Representative and Supervisor, and machine-based Performers such as ERP Engine, ERP GUI and Web Client (which are all software components).

TABLE IV

Performers

Environment
    MyCompany
        General Manager
        Order Management Department
            Customer Service Representative
            Customer Service Supervisor
            ERP Engine
            ERP GUI
        Sales Department
            Technical Sales Representative
            Technical Sales Supervisor
            TeleSales Client
            Web Client
    Customers
    YourCompany
    Shipper Modeling tool 146 can further be utilized to model Classified Locations 406 arranged in a Location Hierarchy 408. As summarized in Table V below, in the present example the root Classified Location in Location Hierarchy 408 is worldwide (WW), which has regional child Classified Locations named Americas, Europe and Asia Pacific, which in turn have child Classified Locations that are individual countries.

TABLE V

Location

WW
    Americas
        US
        Canada
        Mexico
        Brazil
        Argentina
    Europe
        UK
        France
        Spain
    Asia Pacific
        Japan
        China
        India
        Australia
        Singapore Table VI below provides examples of Capability Sentences 400 constructed utilizing modeling tool 146 from the Classified Capabilities, Performers, and Locations defined above and conforming to the SVO-based Capability Grammar described above. As can be seen, these Capability Sentences define the possible activities (e.g., submitting orders of products, checking on the status of existing orders, providing sales quotes) of the sales division of the modeled business organization, specifically detailing the who, what, where, and how of the activities.

TABLE VI

Capability Sentences

| Subject Performer | Classified Capability | | Delivering Performer | | Location |
| --- | --- | --- | --- | --- | --- |
| Technical Sales Representative | Web Submit Brand 1 Order | using | Web Client | in | US |
| Technical Sales Representative | Web Submit Brand 1 & 2 Order | using | Web Client | in | Japan |
| Technical Sales Representative | Telephone Submit Brand 1 Order | using | TeleSales Client | in | France |
| Technical Sales Supervisor | Manage Order Status | using | ERP Engine | in | US |
| Customer Service Representative | Enter Brand 1 Quote | using | ERP GUI | in | UK |
| Technical Sales Supervisor | Enter Brand 1 Quote | using | ERP GUI | in | US |

Once the system model 148 representing the sales division of the modeled business organization has been established utilizing modeling tool 146, modeling tool 146 can be utilized to extend the depth and breadth of system model 148 as desired, as well as to update system model 146 to reflect changes within the business organization or its environment. Further, using the capability sentences formed above, modeling tool 146 can be utilized to query, to analyze and to view system model 146, for example, with:

1. structural queries across space (location) and time (past, present and future);
2. functional queries across space and time;
3. complex system analytics;
4. dependency analysis including structural dependency analysis and functional dependency analysis;
5. quantitative metrics, such as a Level of Automation metric, Level of Process Variation metric and Level of Service-Oriented Architecture Adoption metric.

In this manner, a great understanding of the operation of a complex, hierarchical system can be gained. Further, in some embodiments, the analysis of system model 146 can be utilized to control and optimize real-world parameters of the modeled system, in some cases autonomically. For example, in the exemplary business organization, modeling tool 146 may provide an output (whether automatically or in response to an additional input) requesting or allocating additional IT (information technology) resources, adjusting a salary of a human Performer in a payroll system, executing an electronic purchase order for additional passive resources, etc.

Figure 5A:
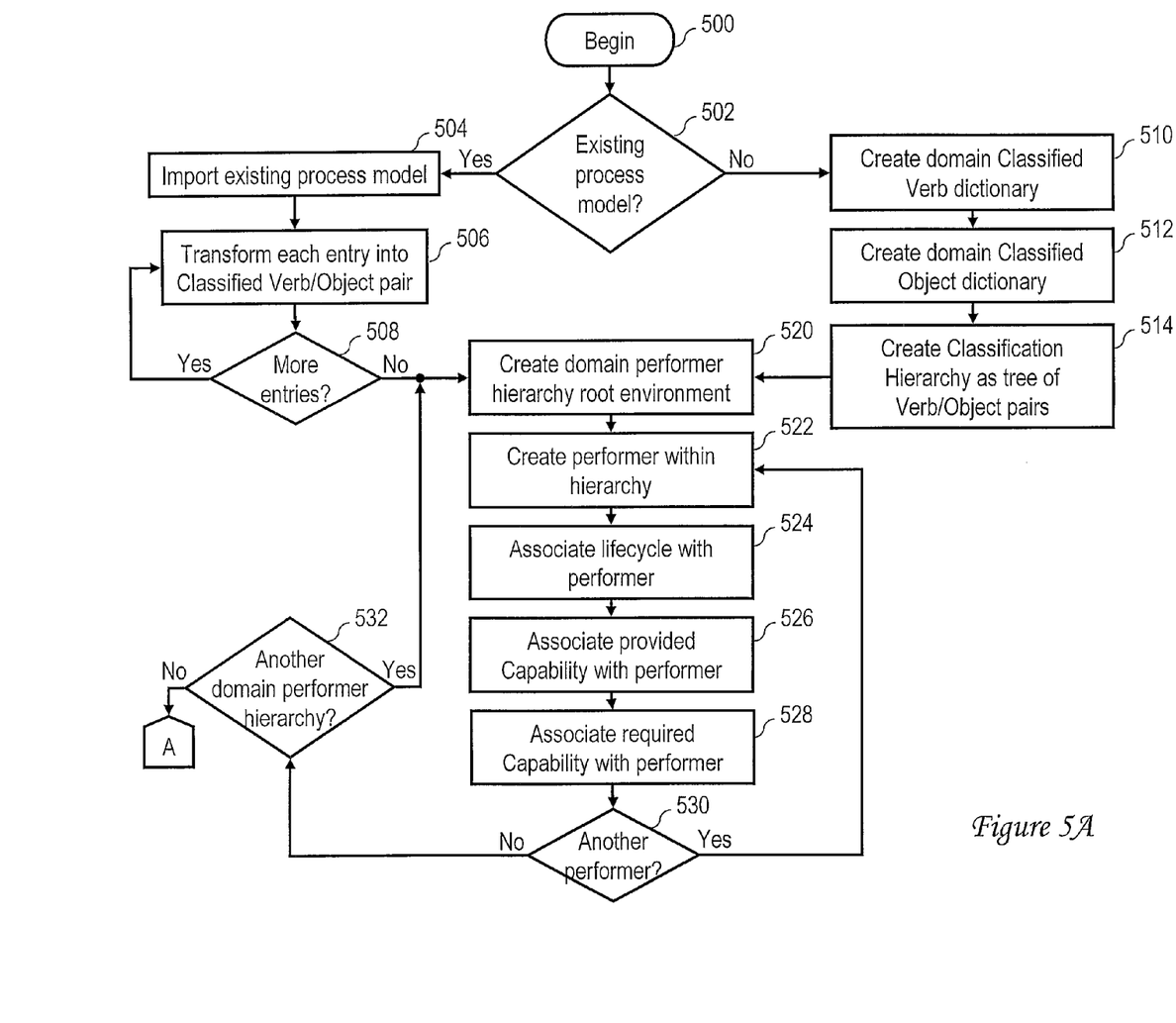
FIGS. 5A-5B together form a high level logical flowchart of an exemplary process for constructing a model of a complex system in accordance with one embodiment.
Figure 5B:
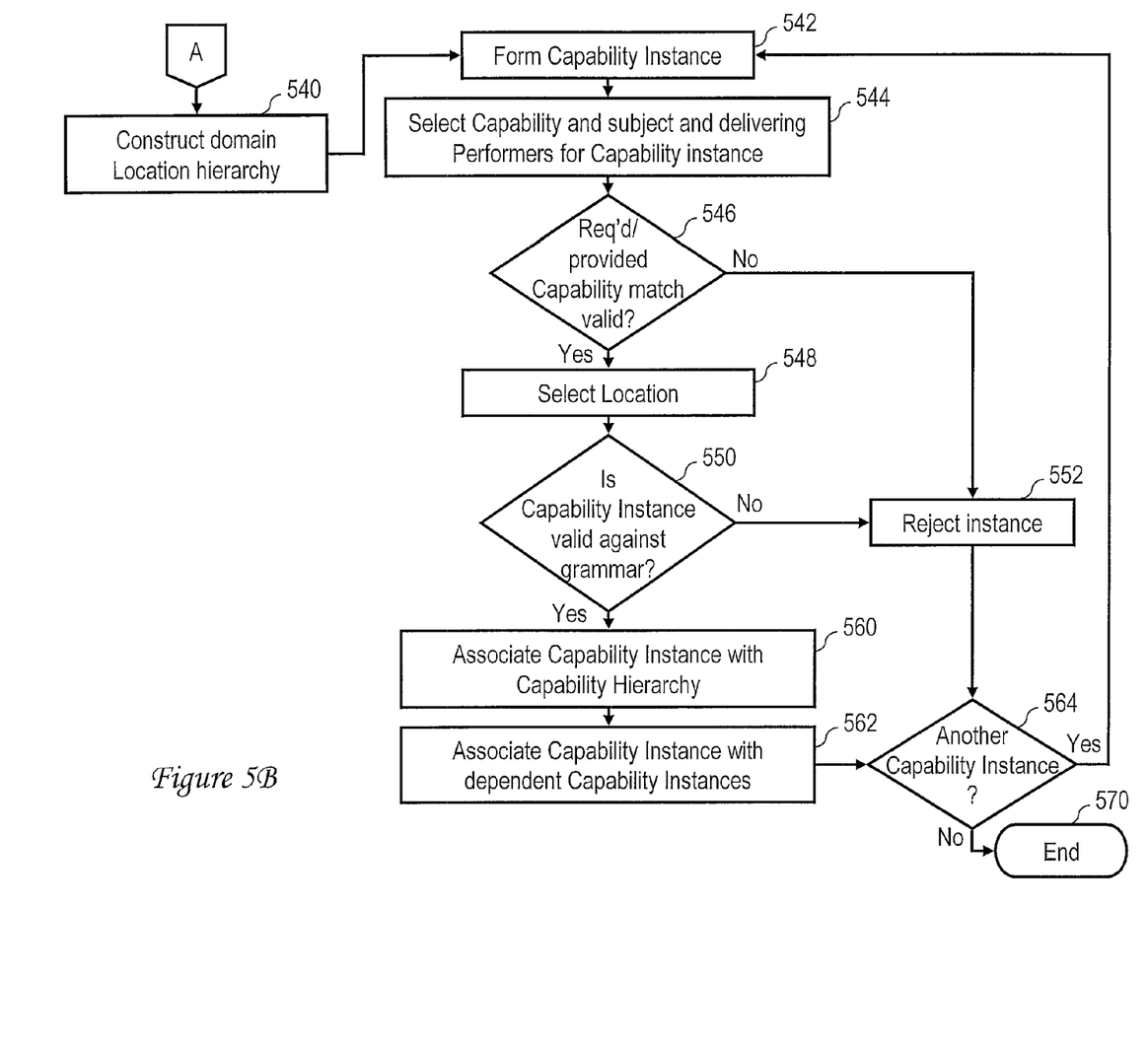

FIGS. 5A-5B together form a high level logical flowchart of an exemplary process for constructing a system model 148 of a complex, hierarchical system utilizing a modeling tool 146 in accordance with one embodiment. The process begins at block 500 and thereafter proceeds to block 502, which depicts a determination of whether or not an existing process model, such as the Process Classification Framework (PCF) promulgated by the American Productivity and Quality Center, International (APQC), has already been established for the complex, hierarchical system to be modeled and therefore can be leveraged to establish a Capability Hierarchy. In not, the process passes to block 510, which is described below. If, however, a determination is made at block 502 that a PCF for the system to be modeled already exists, modeling tool 146 imports the existing process model (e.g., PCF), as shown at block 504. Modeling tool 146 then converts each entry of the existing process model into a Classified Capability comprising a Classified Verb/Classified Object pair as illustrated at blocks 506-508. For example, at block 506, the PCF operating process named "Make Product" would be transformed into the Classified Verb "Make" (or a predefined synonym such as "Produce") and a Classified Object "Product" (and optionally a Specialized Object, such as "Widget"). The process shown at blocks 506-508 continues iteratively until all entries in the existing process model susceptible to transformation have been transformed into Classified Capabilities. As will be appreciated, the transformation can be performed automatically by modeling tool 148 and/or based upon user input. Following completion of the transformation of the process model to establish the Capability Hierarchy, the process proceeds from block 508 to block 520, which is described below.

Referring now to block 510 and additionally to block 512, if a process model of the complex, hierarchical real-world system to be modeled does not already exist, modeling tool 146 creates dictionaries of Classified Verbs and Classified Objects corresponding to the domain (i.e., field of application) of the system to be modeled for use in system model 148. Examples of such Classified Verb and Classified Object dictionaries are given in Tables I and II, supra. Modeling tool 146 can create the dictionaries in response to user input or automatically, for example, based upon predetermined domain-specific defaults accessible to modeling tool 146 or formal or informal industry standards. From these dictionaries, modeling tool 146 creates a Classification Hierarchy (e.g., of Table III) by pairing selected Classified Verbs with selected Classified Objects in a hierarchical manner (block 514). Again, the creation of the Classification Hierarchy can be performed automatically by modeling tool 146 by applying rule-based logic and/or in response to user input.

Following block 514, the process proceeds to blocks 520-530, which collectively depict the construction of a Performer Hierarchy. At block 520, modeling tool 146 creates the root of the Performer Hierarchy, which as described above, is preferably the Environment Performer representing the system boundary of the modeled system. Modeling tool 146 next creates a Performer within the modeled system at block 522.

As indicated previously, the Performer can represent, for example, an abstraction, such as an organization or division thereof, a human that consumes or produces resources, or a machine or component thereof, and can further be a Atomic Performer or Composite Performer. At block 524, modeling tool 146 associates a lifecycle with the Performer created at block 522 and preferably indicates a current lifecycle state (e.g., Proposed, Planned, Under Construction, Deployed, or Retired) of the Performer. In addition, modeling tool 146 associates with the Performer a provided Capability and a required Capability, as shown at blocks 526 and 528. As indicated at block 530, the process of defining Performers described at blocks 522-528 continues iteratively until all of the Performers in the current Performer Hierarchy are defined.

Following a determination at block 530 that all Performers in the current hierarchy have been defined, modeling tool 146 determines at block 532, for example, based upon user input, whether or not another Performer Hierarchy is to be defined in the modeled system. If so, the process returns to block 520, which has been described. If not, the process passes through page connector A to block 540 of FIG. 5B.

Referring now to block 540 of FIG. 5B, modeling tool 146 constructs a Location hierarchy in system model 148 (e.g., represented by one or more data structures), for example, in response to user input. In at least one embodiment, modeling tool 146 supports the graphical construction of Location hierarchy, for example, in response to graphical selection of views of a modeled system. As described above, in many cases, the Location hierarchy may represent multiple hierarchical scopes of geographical Locations (e.g., as shown in Table V), but is not limited to geographical definitions of Location.

From block 540, the process proceeds to the sub-process shown at blocks 542-564, which collectively represent the instantiation of the Capability Instances of system model 148. At block 542, modeling tool 146 first forms a Capability Instance, for example, by creating one or more data structures in system model 148. In response to user inputs, modeling tool 146 then selects a Classified Capability and the subject and delivering Performers for the Capability Instance (block 544). At block 546 modeling tool 146 validates the selected subject and delivering Performers to ensure that the Classified Capability required by the selected subject Performer can be provided by the selected delivering Performer. If modeling tool 146 cannot validate the selected subject and delivering Performers, as indicated by a negative determination at block 546, modeling tool 146 rejects the Capability Instance, as depicted at block 552. Thereafter, the process proceeds to block 564, which is described below.

Returning to block 546, in response to successful validation of the subject and delivering Performers selected for the Capability Instance, the process passes to block 548, which depicts modeling tool 146 selecting a Location for the provision of the Classified Capability from the Location Hierarchy constructed at bock 540. Modeling tool 146 then validates conformance of the entire Capability Instance against the predefined Capability Grammar at block 550. If modeling tool 146 determines at block 550 that the Capability Instance conforms to the Capability Grammar, the process proceeds to block 560, which is described below. If, however, the Capability Instance fails the validation at block 550, modeling tool 146 rejects the Capability Instance, as illustrated at block 552. Thereafter, the process proceeds to block 564, which is described below.

Block 560 depicts modeling tool 146 associating the validated Capability Instance with the Capability Hierarchy (e.g., Capability Hierarchy 402 of FIG. 4), for example, by creating a link between the data structure in system model 148 representing the Capability Instance and the data structure in system model 148 representing the Capability Hierarchy. In addition, at block 562, modeling tool 146 places the Capability Instance at the appropriate location in the Capability Hierarchy by associating zero or more dependent Capability Instances within the Capability Hierarchy as child instances of the Capability Instance. Thereafter, modeling tool 146 determines at block 564, for example, in response to a user input, whether or not another Capability Instance remains to be defined for system model 148 in order to correctly represent the activity of the modeled system. If so, the process returns to block 542 and following blocks, which have been described. If, however, modeling tool 146 determines at block 564 that no additional Capability Instances remain to be defined, the process ends at block 570.

As noted above, once the system model 148 representing the real-world modeled system has been established by modeling tool 146 in accordance with the process depicted in FIGS. 5A-5B, modeling tool 146 can be utilized to extend the depth and breadth of system model 148 as desired, as well as to update system model 146 to reflect changes within the modeled system or its environment. Further, modeling tool 146 can be utilized to query, to analyze and to view a graphical representation of system model 146. The queries and views can be, for example, structural or functional based upon space (location) and/or time (past, present and future). Further, in some embodiments, the analysis of system model 146 can be utilized to control and optimize real-world parameters of the modeled system, in some cases autonomically.

As has been described, a data processing system constructs, in a system model of a real-world system, a multi-level hierarchy of Capabilities, where each Capability includes a Verb specifying an action and an Object acted on by the Verb. The data processing system also constructs one or more multi-level Performer hierarchies, where each Performer hierarchy includes a plurality of Performers each having an associated lifecycle and at least one associated Capability provided or required by the Performer. The data processing system also constructs a multi-level Location hierarchy associating one of a plurality of Locations with each Performer. The data processing system further constructs a plurality of Capability Instances defining requirement and provision of Capabilities by Performers in the one or more multi-level Performer hierarchies. In response to a query specifying a Location and a time, the data processing system outputs a view of the system model for the specified Location and time.

While the present invention has been particularly shown as described with reference to one or more preferred embodiments, it will be understood by those skilled in the art that various changes in form and detail may be made therein without departing from the spirit and scope of the invention. While various embodiments have been particularly shown as described with reference to a preferred embodiment, it will be understood by those skilled in the art that various changes in form and detail may be made therein without departing from the spirit and scope of the claims. For example, although aspects have been described with respect to a computer system executing program code that directs the functions of the present invention, it should be understood that present invention may alternatively be implemented as a program product including a storage medium or storage device storing program code that can be processed by a data processing system.

What is claimed is:

1. A method of modeling a real-world modeled system with a system model in a data processing system, the method comprising:
   the data processing system constructing in the system model a multi-level hierarchy of Capabilities in the real-world system, each Capability including a Verb specifying an action and an Object acted on by the Verb;
   the data processing system constructing in the system model one or more multi-level Performer hierarchies, each Performer hierarchy including a plurality of Performers each having a specified association with an associated lifecycle defined in the system model and a specified association with at least one associated Capability defined in the multi-level hierarchy of Capabilities, wherein each of the at least one associated Capability is one of a set including a provided Capability provided by the Performer and a required Capability required by the Performer, and wherein at least one Performer in the one or more multi-level Performer hierarchies has an associated provided Capability and at least one Performer in the one or more multi-level Performer hierarchies has an associated required Capability;
   the data processing system constructing in the system model a multi-level Location hierarchy associating one of a plurality of Locations with each Performer in the one or more multi-level Performer hierarchies;
   the data processing system constructing in the system model a plurality of Capability Instances defining requirement and provision of Capabilities by Performers in the one or more multi-level Performer hierarchies, wherein each of the plurality of Capability Instances specifies a particular Capability defined in the multi-level hierarchy of Capabilities, a subject Performer that requires the particular Capability, and a delivering Performer that delivers the particular Capability to the subject Performer;
   in response to a user input identifying, for a proposed Capability Instance, a selected subject Performer, a selected delivering Performer and a selected Capability, the data processing system validating, by reference to the one or more multi-level Performer hierarchies, that the selected delivering Performer can provide the selected Capability to the selected subject Performer;
   in response to validating that the selected delivering Performer can provide the selected Capability to the selected subject Performer, the data processing system constructing the proposed Capability Instance as one of the plurality of Capability Instances in the system model;
   in response to failure of the validating, the data processing system rejecting the proposed Capability Instance from inclusion in the system model; and
   in response to a query specifying a Location and a simulated time, the data processing system outputting a view of the system model for the specified Location and simulated time.

2. The method of claim 1, wherein constructing a multi-level hierarchy of Capabilities includes transforming an existing process model of the modeled system to obtain the multi-level hierarchy of Capabilities.

3. The method of claim 1, wherein the plurality of Performers in the one or more multi-level Performer hierarchies represent at least one human Performer and at least one machine Performer in the real-word modeled system.

4. The method of claim 1, wherein constructing a multi-level Location hierarchy comprises constructing a multi-level hierarchy of geographic locations.

5. The method of claim 1, wherein constructing a plurality of Capability Instances comprises constructing the plurality of Capability Instances in conformance with a Capability Grammar having a Subject-Verb-Object (SVO) format.

6. The method of claim 1, wherein:
   the lifecycle defined in the system model for a particular Performer among the plurality of Performers in one of the one or more multi-level Performer hierarchies includes:
      a first lifecycle state corresponding to simulated times at which the particular Performer does not exist in the real-world modeled system;
      a second lifecycle state corresponding to simulated times at which the particular Performer exists in the real-world modeled system; and
   the outputting comprises filtering the particular Performer out of the view of the system model in response the simulated time specified by the query being associated by the lifecycle of the particular Performer with the first lifecycle state.

7. A data processing system for modeling a real-world modeled system with a system model, the data processing system comprising:
   a processor unit; and
   data storage coupled to the processor unit, said data storage including a modeling tool that is configured, when executed by the processor unit, to cause the data processing system to perform:
      the data processing system constructing in the system model a multi-level hierarchy of Capabilities in the real-world system, each Capability including a Verb specifying an action and an Object acted on by the Verb;
      the data processing system constructing in the system model one or more multi-level Performer hierarchies, each Performer hierarchy including a plurality of Performers each having a specified association with an associated lifecycle defined in the system model and a specified association with at least one associated Capability defined in the multi-level hierarchy of Capabilities, wherein each of the at least one associated Capability is one of a set including a provided Capability provided by the Performer and a required Capability required by the Performer, and wherein at least one Performer in the one or more multi-level Performer hierarchies has an associated provided Capability and at least one Performer in the one or more multi-level Performer hierarchies has an associated required Capability;
      the data processing system constructing in the system model a multi-level Location hierarchy associating one of a plurality of Locations with each Performer in the one or more multi-level Performer hierarchies;
      the data processing system constructing in the system model a plurality of Capability Instances defining requirement and provision of Capabilities by Performers in the one or more multi-level Performer hierarchies, wherein each of the plurality of Capability Instances specifies a particular Capability defined in the multi-level hierarchy of Capabilities, a subject Performer that requires the particular Capability, and a delivering Performer that delivers the particular Capability to the subject Performer;

in response to a user input identifying, for a proposed Capability Instance, a selected subject Performer, a selected delivering Performer and a selected Capability, the data processing system validating, by reference to the one or more multi-level Performer hierarchies, that the selected delivering Performer can provide the selected Capability to the selected subject Performer;

in response to validating that the selected delivering Performer can provide the selected Capability to the selected subject Performer, the data processing system constructing the proposed Capability Instance as one of the plurality of Capability Instances in the system model;

in response to failure of the validating, the data processing system rejecting the proposed Capability Instance from inclusion in the system model; and in response to a query specifying a Location and a simulated time, the data processing system outputting a view of the system model for the specified Location and simulated time.

8. The data processing system of claim 7, wherein constructing a multi-level hierarchy of Capabilities includes transforming an existing process model of the modeled system to obtain the multi-level hierarchy of Capabilities.

9. The data processing system of claim 7, wherein the plurality of Performers in the one or more multi-level Performer hierarchies represent at least one human Performer and at least one machine Performer in the real-word modeled system.

10. The method of claim 1, wherein constructing a multi-level Location hierarchy comprises constructing a multi-level hierarchy of geographic locations.

11. The data processing system of claim 7, wherein constructing a plurality of Capability Instances comprises constructing the plurality of Capability Instances in conformance with a Capability Grammar having a Subject-Verb-Object (SVO) format.

12. The data processing system of claim 7, wherein:
the lifecycle defined in the system model for a particular Performer among the plurality of Performers in one of the one or more multi-level Performer hierarchies includes:
a first lifecycle state corresponding to simulated times at which the particular Performer does not exist in the real-world modeled system;
a second lifecycle state corresponding to simulated times at which the particular Performer exists in the real-world modeled system; and
the outputting comprises filtering the particular Performer out of the view of the system model in response the simulated time specified by the query being associated by the lifecycle of the particular Performer with the first lifecycle state.

13. A program product for modeling a real-world modeled system with a system model in a data processing system, the program product comprising:
a non-transitory data storage medium readable by a data processing system; and
program code stored within the non-transitory data storage medium and configured, when executed by a processor unit, to cause the data processing system to perform:
the data processing system constructing in the system model a multi-level hierarchy of Capabilities in the real-world system, each Capability including a Verb specifying an action and an Object acted on by the Verb;

the data processing system constructing in the system model one or more multi-level Performer hierarchies, each Performer hierarchy including a plurality of Performers each having a specified association with an associated lifecycle defined in the system model and a specified association with at least one associated Capability defined in the multi-level hierarchy of Capabilities, wherein each of the at least one associated Capability is one of a set including a provided Capability provided by the Performer and a required Capability required by the Performer, and wherein at least one Performer in the one or more multi-level Performer hierarchies has an associated provided Capability and at least one Performer in the one or more multi-level Performer hierarchies has an associated required Capability;

the data processing system constructing in the system model a multi-level Location hierarchy associating one of a plurality of Locations with each Performer in the one or more multi-level Performer hierarchies;

the data processing system constructing in the system model a plurality of Capability Instances defining requirement and provision of Capabilities by Performers in the one or more multi-level Performer hierarchies, wherein each of the plurality of Capability Instances specifies a particular Capability defined in the multi-level hierarchy of Capabilities, a subject Performer that requires the particular Capability, and a delivering Performer that delivers the particular Capability to the subject Performer;

in response to a user input identifying, for a proposed Capability Instance, a selected subject Performer, a selected delivering Performer and a selected Capability, the data processing system validating, by reference to the one or more multi-level Performer hierarchies, that the selected delivering Performer can provide the selected Capability to the selected subject Performer;

in response to validating that the selected delivering Performer can provide the selected Capability to the selected subject Performer, the data processing system constructing the proposed Capability Instance as one of the plurality of Capability Instances in the system model;

in response to failure of the validating, the data processing system rejecting the proposed Capability Instance from inclusion in the system model; and in response to a query specifying a Location and a simulated time, the data processing system outputting a view of the system model for the specified Location and simulated time.

14. The program product of claim 13, wherein constructing a multi-level hierarchy of Capabilities includes transforming an existing process model of the modeled system to obtain the multi-level hierarchy of Capabilities.

15. The program product of claim 13, wherein the plurality of Performers in the one or more multi-level Performer hierarchies represent at least one human Performer and at least one machine Performer in the real-word modeled system.

16. The program product of claim 13, wherein constructing a multi-level Location hierarchy comprises constructing a multi-level hierarchy of geographic locations.

17. The program product of claim 13, wherein constructing a plurality of Capability Instances comprises constructing the plurality of Capability Instances in conformance with a Capability Grammar having a Subject-Verb-Object (SVO) format.

18. The program product of claim 13, wherein:
the lifecycle defined in the system model for a particular Performer among the plurality of Performers in one of the one or more multi-level Performer hierarchies includes:
a first lifecycle state corresponding to simulated times at which the particular Performer does not exist in the real-world modeled system;
a second lifecycle state corresponding to simulated times at which the particular Performer exists in the real-world modeled system; and
the outputting comprises filtering the particular Performer out of the view of the system model in response the simulated time specified by the query being associated by the lifecycle of the particular Performer with the first lifecycle state.

19. The method of claim 1, wherein:
the method further comprises:
in the system model, creating a Verb dictionary defining multiple Verbs each specifying an action that can be performed in the real-world modeled system;
in the system model, creating an Object dictionary defining multiple Objects that each can be acted on by at least one of the Verbs;
constructing the multi-level hierarchy of Capabilities includes:
after creating the Verb dictionary and creating the Object dictionary, constructing the multi-level hierarchy of Capabilities from the multiple Verbs defined in Verb dictionary and the multiple Objects defined in the Object dictionary; and
the multi-level hierarchy of Capabilities indicates which Verb-Object pairings are permitted in the system model.

20. The method of claim 1, wherein constructing the plurality of Capability Instances includes constructing the plurality of Capability Instances in response to receipt of user input following construction of the one or more multi-level Performer hierarchies.

21. The method of claim 1, wherein each of the plurality of Capability Instances further specifies one of a plurality of Locations at which the delivering Performer provides the particular Capability to the subject Performer.

22. The method of claim 1, wherein constructing the multi-level hierarchy of Capabilities, the one or more multi-level Performer hierarchies, the multi-level Location hierarchy, and the Capability Instances includes constructing in the system model separate inter-linked data structures for each of the multi-level hierarchy of Capabilities, the one or more multi-level Performer hierarchies, the multi-level Location hierarchy, and the Capability Instances.

23. The method of claim 1, and further comprising:
enrolling each of the plurality of Capability instances with the multi-level hierarchy of Capabilities such that the multi-level hierarchy of Capabilities indicates the number of process variations by the number of enrolled Capability instances.

24. The method of claim 1, and further comprising:
constructing in the system model a Capability dependency network indicating a subset of the Capabilities specified in the system model that are enabled.

25. The method of claim 5, wherein constructing a plurality of Capability Instances includes rejecting a proposed Capability Instance as one of the plurality of Capability Instances that does not conform with the Capability Grammar.

26. A method of modeling a real-world modeled system with a system model in a data processing system, the method comprising:
in one or more first data structures of the system model, the data processing system defining multiple Verbs each specifying an action in the real-world modeled system and defining multiple Objects each of which can be acted upon by one or more the Verbs;

after the defining, the data processing system constructing in the system model one or more second data structures specifying Capabilities in the real-world system, wherein each of the Capabilities includes a Verb specifying an action and an Object acted on by the Verb, wherein the Verb and the Object forming the Capability are identified by links between the one or more first data structures and the one or more second data structures;

after constructing the one or more second data structures, the data processing system constructing in the system model one or more third data structures specifying one or more multi-level Performer hierarchies, each Performer hierarchy including a plurality of Performers each having a specified association with an associated lifecycle defined in the system model and a specified association with at least one associated Capability defined in the multi-level hierarchy of Capabilities, wherein:

each of the at least one associated Capability is one of a set including a provided Capability provided by the Performer and a required Capability required by the Performer;

at least one Performer in the one or more multi-level Performer hierarchies has an associated provided Capability and at least one Performer in the one or more multi-level Performer hierarchies has an associated required Capability; and the at least one associated Capability of each Performer is identified by a link between one of the one or more third data structures and the one or more second data structures;

the data processing system constructing in the system model one or more fourth data structures specifying a multi-level Location hierarchy including a plurality of Locations, wherein each Performer in the one or more multi-level Performer hierarchies is associated with one of the plurality of Locations by a respective link between the one or more fourth data structures and the one or more third data structures;

the data processing system constructing in the system model one or more fifth data structures specifying a plurality of Capability Instances defining requirement and provision of Capabilities by Performers in the one or more multi-level Performer hierarchies, wherein, by links to the one or more second data structures and the one or more third data structures, each of the plurality of Capability Instances specifies a particular Capability defined in the multi-level hierarchy of Capabilities, a subject Performer that requires the particular Capability, and a delivering Performer that delivers the particular Capability to the subject Performer; and in response to a query specifying a Location and a simulated time, the data processing system outputting a view of the system model for the specified Location and simulated time.

27. A data processing system for modeling a real-world modeled system with a system model in a data processing system, the data processing system comprising:

a processor unit; and data storage coupled to the processor unit, said data storage including a modeling tool that is configured, when executed by the processor unit, to cause the data processing system to perform:

in one or more first data structures of the system model, the data processing system defining multiple Verbs each specifying an action in the real-world modeled system and defining multiple Objects each of which can be acted upon by one or more the Verbs;

after the defining, the data processing system constructing in the system model one or more second data structures specifying Capabilities in the real-world system, wherein each of the Capabilities includes a Verb specifying an action and an Object acted on by the Verb, wherein the Verb and the Object forming the Capability are identified by links between the one or more first data structures and the one or more second data structures;

after constructing the one or more second data structures, the data processing system constructing in the system model one or more third data structures specifying one or more multi-level Performer hierarchies, each Performer hierarchy including a plurality of Performers each having a specified association with an associated lifecycle defined in the system model and a specified association with at least one associated Capability defined in the multi-level hierarchy of Capabilities, wherein:

each of the at least one associated Capability is one of a set including a provided Capability provided by the Performer and a required Capability required by the Performer;

at least one Performer in the one or more multi-level Performer hierarchies has an associated provided Capability and at least one Performer in the one or more multi-level Performer hierarchies has an associated required Capability; and the at least one associated Capability of each Performer is identified by a link between one of the one or more third data structures and the one or more second data structures;

the data processing system constructing in the system model one or more fourth data structures specifying a multi-level Location hierarchy including a plurality of Locations, wherein each Performer in the one or more multi-level Performer hierarchies is associated with one of the plurality of Locations by a respective link between the one or more fourth data structures and the one or more third data structures;

the data processing system constructing in the system model one or more fifth data structures specifying a plurality of Capability Instances defining requirement and provision of Capabilities by Performers in the one or more multi-level Performer hierarchies, wherein, by links to the one or more second data structures and the one or more third data structures, each of the plurality of Capability Instances specifies a particular Capability defined in the multi-level hierarchy of Capabilities, a subject Performer that requires the particular Capability, and a delivering Performer that delivers the particular Capability to the subject Performer; and in response to a query specifying a Location and a simulated time, the data processing system outputting a view of the system model for the specified Location and simulated time.

28. A program product for modeling a real-world modeled system with a system model in a data processing system, the program product comprising:

a non-transitory data storage medium readable by a data processing system; and program code stored within the non-transitory data storage medium and configured, when executed by a processor unit, to cause the data processing system to perform:

in one or more first data structures of the system model, the data processing system defining multiple Verbs each specifying an action in the real-world modeled system and defining multiple Objects each of which can be acted upon by one or more the Verbs;

after the defining, the data processing system constructing in the system model one or more second data structures specifying Capabilities in the real-world system, wherein each of the Capabilities includes a Verb specifying an action and an Object acted on by the Verb, wherein the Verb and the Object forming the Capability are identified by links between the one or more first data structures and the one or more second data structures;

after constructing the one or more second data structures, the data processing system constructing in the system model one or more third data structures specifying one or more multi-level Performer hierarchies, each Performer hierarchy including a plurality of Performers each having a specified association with an associated lifecycle defined in the system model and a specified association with at least one associated Capability defined in the multi-level hierarchy of Capabilities, wherein:

each of the at least one associated Capability is one of a set including a provided Capability provided by the Performer and a required Capability required by the Performer;

at least one Performer in the one or more multi-level Performer hierarchies has an associated provided Capability and at least one Performer in the one or more multi-level Performer hierarchies has an associated required Capability; and the at least one associated Capability of each Performer is identified by a link between one of the one or more third data structures and the one or more second data structures;

the data processing system constructing in the system model one or more fourth data structures specifying a multi-level Location hierarchy including a plurality of Locations, wherein each Performer in the one or more multi-level Performer hierarchies is associated with one of the plurality of Locations by a respective link between the one or more fourth data structures and the one or more third data structures;

the data processing system constructing in the system model one or more fifth data structures specifying a plurality of Capability Instances defining requirement and provision of Capabilities by Performers in the one or more multi-level Performer hierarchies, wherein, by links to the one or more second data structures and the one or more third data structures, each of the plurality of Capability Instances specifies a particular Capability defined in the multi-level hierarchy of Capabilities, a subject Performer that requires the particular Capability, and a delivering Performer that delivers the particular Capability to the subject Performer; and in response to a query specifying a Location and a simulated time, the data processing system outputting a view of the system model for the specified Location and simulated time.

* * * * *